Dec. 18, 1962   M. M. NYBORG   3,068,823
SOLDERING APPARATUS
Filed Sept. 12, 1956   3 Sheets-Sheet 1
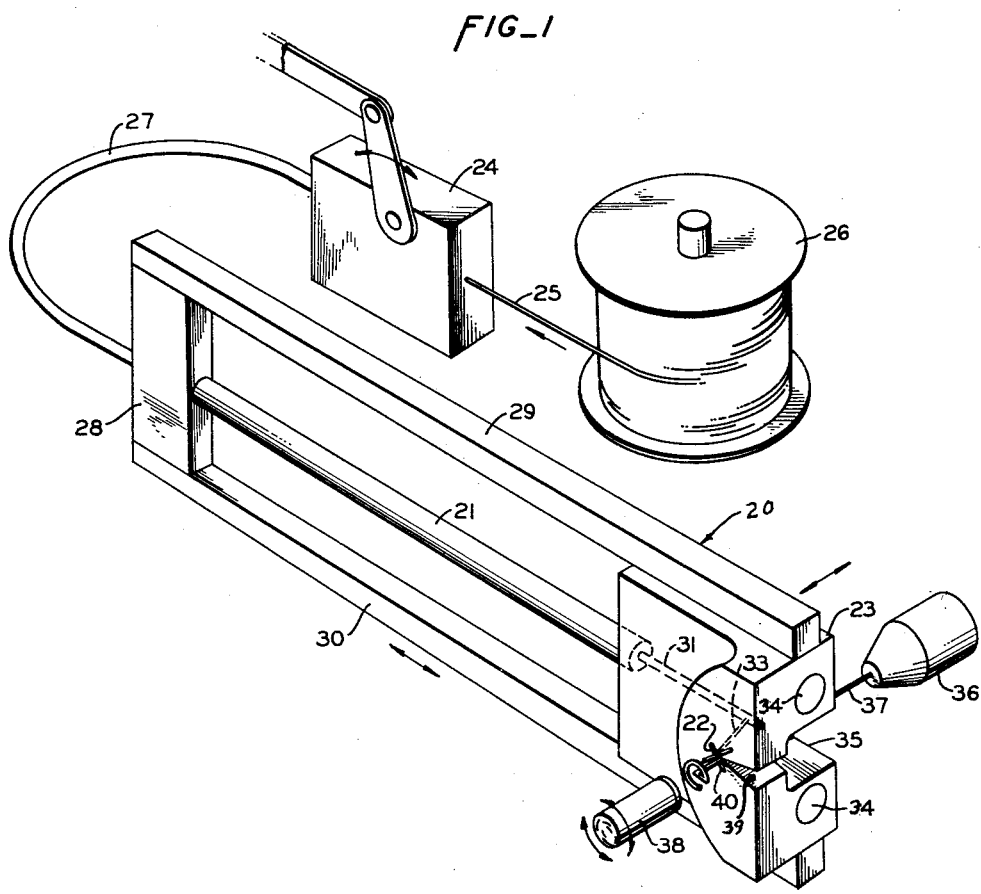
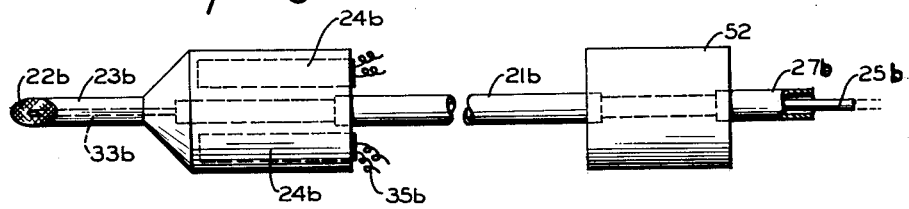
INVENTOR.
MEREDITH M. NYBORG
BY
Mellin and Hanscom
ATTORNEYS Dec. 18, 1962  M. M. NYBORG  3,068,823
SOLDERING APPARATUS
Filed Sept. 12, 1956  3 Sheets-Sheet 2
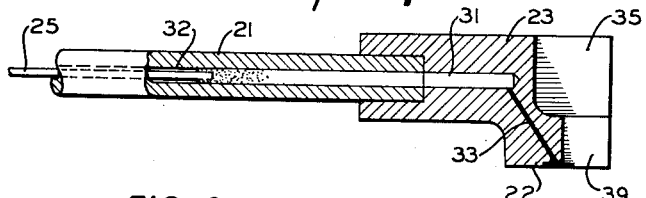
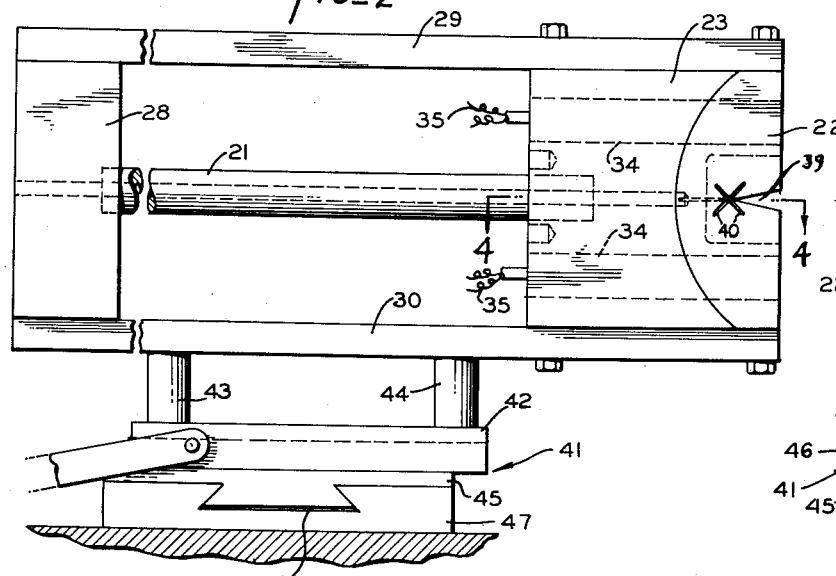
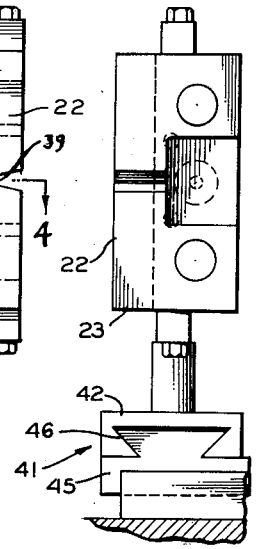
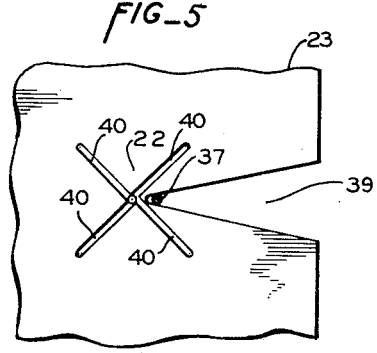
INVENTOR.
MEREDITH M. NYBORG
BY
Mellin and Hanscom
ATTORNEYS Dec. 18, 1962 — M. M. NYBORG — 3,068,823
SOLDERING APPARATUS
Filed Sept. 12, 1956 — 3 Sheets-Sheet 3

INVENTOR.
MEREDITH M. NYBORG
BY
*Mellin and Hanscom*
ATTORNEYS

United States Patent Office 3,068,823
Patented Dec. 18, 1962

3,068,823
SOLDERING APPARATUS
Meredith M. Nyborg, 517 W. Highland Drive,
Camarillo, Calif.
Filed Sept. 12, 1956, Ser. No. 609,788
1 Claim. (Cl. 113—59)

This application is a continuation-in-part of my application entitled "Soldering Apparatus," filed September 1, 1955, and bearing Serial No. 531,979, and now abandoned.

This invention relates to an automatic soldering apparatus. More particularly, the invention relates to a method and apparatus for soldering aluminum and similar materials. This invention relates to and utilizes some of the principles of the invention disclosed in my copending application entitled "Apparatus for Handling Fusible Materials," Serial No. 498,835, filed April 4, 1955, and now abandoned; and reference is hereby made to that application for the disclosure contained therein insofar as it is pertinent to the invention of the present application.

In general, the art of soldering is characterized by the requirement that metal oxides normally present on the surfaces to be soldered must be removed or destroyed in order to expose the metal itself to the molten solder. Unless this is done, the oxides act as a barrier layer between the metal and the solder and prevent mutual adherence therebetween.

In most soldering operations, a chemical flux is used, its purpose being to penetrate, loosen, and suspend the oxides and thus permit the solder to make metal-to-metal contact with the surface to be soldered. Fluxes and their residues, being chemically active substances, are objectionable in many finished soldered joints and must be carefully removed. The oxides of some metals, notably aluminum, are so tenacious and resistant to chemical attack that fluxes required to remove them are necessarily excessively active and objectionable.

As is well known, oxides are formed on clean metal surfaces in the presence of air. At the elevated temperatures used in soldering, this formation may be extremely rapid so that even after the oxides have been removed by a flux, or by mechanical abrasion, they may reform before the soldering operation can be completed. To prevent this, it is necessary to exclude air from the surface during the soldering process.

It is among the primary objects of this invention to provide a novel method of soldering aluminum and other metals, without the use of a chemical flux.

Another object of this invention is to provide a method of soldering wherein molten solder is applied to the surface to be soldered and, while the solder is maintained in a molten state, the metal surface therebeneath is abraded to expose the virgin metal to the solder.

A further object of the invention is to provide a novel soldering apparatus for soldering aluminum and other metals wherein molten solder is positively fed onto the surface to be soldered, and at the same time the surface is abraded through the solder to expose the virgin metal to the solder.

A still further object of the invention is to provide a soldering apparatus wherein the solder is supplied in the molten state through a suitable port in the soldering tip, and wherein the surface of the soldering tip is adapted to abrade the surface of the metal to be soldered so as to remove surface elements tending to impair or prevent the soldering action.

Still another object is to provide a soldering apparatus wherein the soldering tip is made from, faced with, or having embedded therein hard material capable of abrading the surface to be soldered.

Illustrative embodiments of the invention are described in the following detailed specification, and are shown by way of example in the accompanying drawings, wherein:

FIG. 1 is a perspective view of one form of the invention used to solder pigtails on electrical condensers.

FIGS. 2 and 3 are side and end views, respectively, of the form shown in FIG. 1.

FIG. 4 is a sectional view taken on line 4—4 of FIG. 2.

FIG. 5 is a fragmentary view of the soldering face of the tip, drawn to an enlarged scale.

FIG. 8 is a plan view of a third embodiment of the invention illustrating a hand manipulated soldering apparatus.

Figure 6:
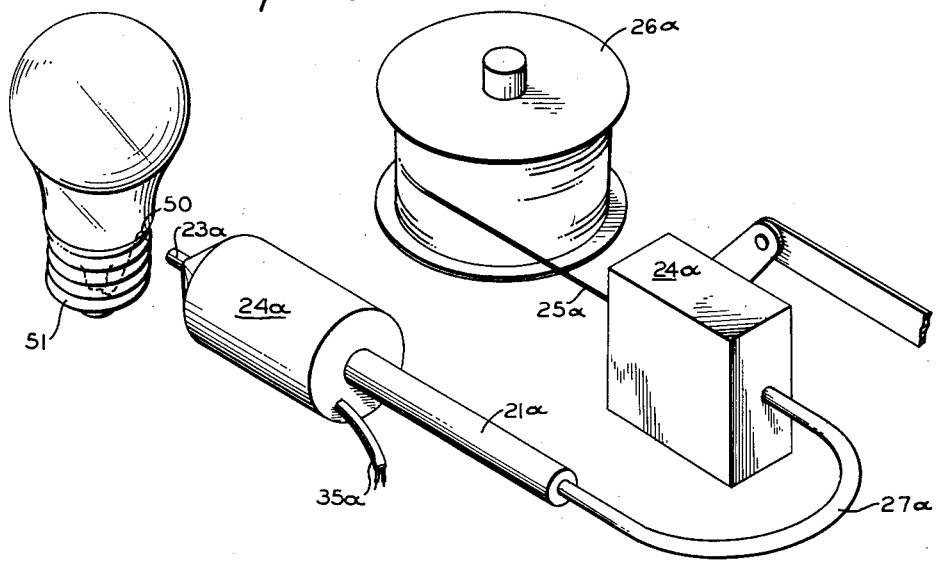
FIG. 6 is a perspective view of another form of the invention used for soldering a wire to a flat surface and illustrated in use to solder a wire to an aluminum lamp base.

Referring now to the drawings wherein similar reference numerals are used to denote the same elements throughout the various views shown, and referring more particularly to FIG. 1 thereof, the soldering apparatus, generally indicated at 20, comprises a temperature gradient tube 21 for supplying solder in the molten state to the soldering surface 22 of a soldering tip 23 in the manner fully disclosed in my above identified copending application, Serial No. 498,835. A feeding mechanism 24 feeds the solder 25 from a supply, such as a spool 26, through a flexible conduit 27 to the rear end of the temperature gradient tube 21. The feeding mechanism 24 is preferably of the type wherein the solder is advanced in step-by-step fashion as needed. At its rearward end, the gradient tube 21 is supported in a mounting block 28 connected to the soldering tip 23 by upper and lower rods 29 and 30, respectively.

The soldering head 23 is made of a material capable of shearing or abrading the surface to be soldered sufficiently to remove oxides, dirt, grease and other extraneous matter. One of the primary requisites is that the material be sufficiently hard to cut or abrade the surface to be soldered. Also, the material must be capable of withstanding heat in the order of about 900° to 1000° F., for prolonged periods without material impairment by oxization, reduction of hardness, deformation, reactance with solder, or other physical or chemical reaction. Of course, the material must be wear-resistant, so that the cutting and abrading properties of the material will stand up under severe conditions and for long periods of continuous usage.

For example, the head may be made of very hard metal, such as chromium, steel, or steel alloyed with chromium, tungsten or other hardening substance. However, I prefer the use of a refractory, such as silicon carbide bonded by means of silicon nitride. Such materials are extremely hard and resistant to impairment by heat, oxidization and reaction with solder even after prolonged usage at a soldering temperature of 1000° F. or higher. Other materials of similar character which have been found particularly suitable for the purposes of this invention include chromium carbide, tungsten carbide, zirconium boride, and aluminum oxide. Such materials may be incorporated as sharp granules or grits in a matrix of a fine grained refractory, ceramic or metal.

Some refractory and ceramic materials have an inherent roughness of surface to obtain the desired cutting or abrading effect without special treatment. In most cases however, the soldering face is roughened by knurling, ribbing, or other roughening treatment, to produce a file-like surface. Where hard grit or granules are embedded in a softer matrix, the result is comparable to sandpaper or emery cloth having a myriad of sharp points or edges effective for abrading the surface to be soldered.

The soldering head 23 is provided with a blind bore or solder reservoir 31 continuing from the internal passage 32 through the gradient tube 21 in the manner shown in FIG. 4. The blind end of the bore 31 is connected to the soldering surface 22 of the tip 23 by a restricted orifice passageway 33, whereby, as the solder 25 is advanced in the gradient tube 21, the molten solder will be forced through the restricted passageway 33 and onto the soldering surface 22.

Referring again now to FIGS. 1 and 2, the soldering tip 23 and the forward end of the gradient tube 21 are maintained above the melting point of the solder by cartridge type electrical heating elements 34 connected by means of wires 35 to any suitable source of electrical energy. The passageway 33 is sufficiently restricted to cause the molten solder to back slightly into the supply passage so as to provide an effective seal for preventing the entrance of air with the solder onto the area to be soldered, as disclosed in the companion application above referred to.

Since the modification shown in FIGS. 1 through 5 was specifically designed for soldering the pigtail connections to the ends of condensers, such as used in radios and similar devices, the soldering surface is on the side of the soldering tip 23 and is located on a portion of the tip which is projected laterally outwardly from the remainder of the tip 23. A generally rectangular opening 35 is provided in the back side of the soldering tip 23 to accommodate a mounting chuck 36 for holding a pigtail 37 to be soldered to a condenser 38. Similarly, a U-shaped notch 39 is cut into the end of the tip 23 to permit the pigtail 37 to extend therein adjacent the outer end of the restricted passageway 33.

A plurality of outwardly extending grooves 40 are provided in the soldering surface 22 and the inner end of each of the grooves 40 is connected to the outer end of the restricted orifice pasageway 33. The grooves 40 serve a double purpose; first, the grooves act as distributing grooves to distribute the solder outwardly from the outer end of the restricted pasageway 33 to insure a film completely covering the end of the condenser 38 during the soldering process, and, second, the edges of the grooves 40 serve as scrapers to scrape the surface of the end of the condenser 38 to remove any oxides which may be present on the metal foil layers to be soldered. In the latter connection, the edges of the grooves may provide adequate cutting or abrading means, without need for additional knurling or ribbing. This is particularly so where the head is to be used for soldering curved surfaces, or where the surface to be soldered is sufficiently soft to permit the edges of the grooves to bite into the surface due to interfacial pressure.

As illustrated, the grooves 40 extend radially from the outlet of the passageway 33 at about 90° relative to each other. This angular spacing of the grooves may be varied to suit varying requirements, depending upon the character of the surface to be treated, and the degree of oscillation of the head which is desired. Where the degree of oscillating movement is small, a smaller angle between adjacent grooves is desirable. The number of grooves 40 may be increased to insure that the entire surface to be soldered is adequately abraded by a short angular motion of the head and the surface to be soldered, relative to each other.

Since the device as embodied in this modification is designed for use in an automatic soldering machine or process, the lower connecting rod 30 is mounted on the upper surface of the two-way slide mechanism generally indicated at 41 in FIGS. 2 and 3. The two-way slide mechanism 41 comprises an upper member 42 fixed to the lower connecting rod 30 by two upwardly extending legs 43 and 44. The lower surface of the member 42 is connected to an intermediate member 45 by a longitudinally extending dovetail connection indicated at 46 in FIG. 3. Similarly, the intermediate member 45 is connected to a bottom or base member 47 by a laterally extending dovetail connection indicated at 48 in FIG. 2.

In the use of this modification, the pigtail 37 is mounted in the holding chuck 36 and the condenser 38 is mounted in a similar chuck (not shown). The soldering tip 23 is advanced by means of the dovetail connection 46 until the wire of the pigtail 37 is in the bottom of the notch 39. The soldering head is then moved laterally by means of the dovetail connection 48 until the spiral end of the pigtail member 37 lies against the soldering surface 22 of the tip 23. The chuck holding the condenser 38 is then advanced laterally until the end of said condenser contacts the soldering surface. The solder-advancing mechanism 24 is actuated to provide a supply of solder on the soldering surface 22, and the chuck holding the condenser is moved to oscillate the condenser 38 about its axis, so that the edges of the grooves 40 will scrape the end of the foil layers and remove any oxides present thereon to expose the virgin metal to the solder. The condenser 38 is a conventional condenser, being composed of alternate layers of very thin foil and paper, and is quite soft and yielding, such that when the chuck holding the condenser moves the condenser against the soldering surface 22, the pigtail 37 will not only be embedded in the end surface of the condenser, but the foil and paper layer will be partially compressed. Thus, the foil and the surface of the loop of the pigtail will be in intimate engagement with the soldering surface 22, with the foil being more or less compressed around the wire. As the condenser is rotated, the pigtail will rotate with it as it is sufficiently constrained by the deformed foil so as to be required to move with it. While the condenser 38 and the pigtail 37 are maintained in engaged relationship, the soldering tip 23 is moved rearwardly and slid away from the end of the condenser 38 and the pigtail 37 to permit the solder to harden thereon and complete the soldering operation. Subsequently, the tip 23 is moved laterally away from the condenser 38 so that the assembled pigtail and condenser can be removed from their respective holding chucks.

Figure 7:
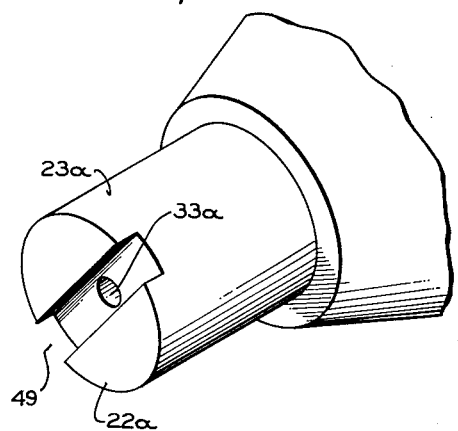
FIG. 7 is a perspective view of the soldering tip used in the embodiment illustrated in FIG. 6.

FIGS. 6 and 7 illustrate a modification of the device illustrated in FIGS. 1 through 5 of the type designed for use in soldering the electrical lead connected to the filament wire of an electric light bulb to the aluminum base of the bulb. In this modification, the solder 25a is again fed from a supply reel 26a by means of a solder-advancing mechanism 24a, through a flexible tube 27a, through the rear end of a gradient tube 21a, and from the forward end of the gradient tube 21a through a restricted orifice passageway 33a terminating at a forward end of a cylindrical soldering tip 23a. The soldering tip 23a and the forward end of the temperature gradient tube 21a are heated by a cylindrical heating coil indicated at 34a, and adapted to be connected to a suitable source of electrical energy by wires indicated at 35a. The forward end of the tip 23a is provided with a diametrical slot 39 adapted to receive the end of a wire 50 to be soldered to a lamp base 51.

In the use of the device shown in this embodiment, the soldering tip 23a is advanced until the soldering surface 22a thereof is in contact with the lamp base 51, with the wire 50 received within the groove 49. The tip 23a is then oscillated about its axis so that the edges of the groove 49 will scrape the oxides from the surface of the lamp base 51, and solder is advanced through the orifice passageway 33a by means of the feeding mechanism 24a. The tool is then withdrawn from the lamp base and the solder permitted to harden thereon.

FIG. 8 illustrates a hand soldering iron used for general purpose soldering. This apparatus is essentially similar to that shown in FIGS. 6 and 7. However, tip 23a is replaced with a tip 23b having a soldering surface 22b inclined to the axis of the tip and provided with knurling or other type roughened surface to permit scraping of the surfaces of the members to be soldered to remove the oxides therefrom. The modification shown in FIG. 8 is also provided with a handle 52 at the rear end of the gradient tube 21b to permit the handling thereof by a person using the device.

In the use of the modification shown in FIG. 8, the iron is brought to the work, the solder 25b is advanced through the gradient tube 21b in the same manner as described above, and molten solder flows from the forward end of the restricted passageway 33b. The soldering tip is then moved back and forth relative to the surface to be soldered so that the roughened or knurled surface thereof will scrape the oxides from the surfaces to be soldered and permit the molten solder to have access to the virgin metal therebeneath.

In ordinary soldering methods, the highest temperature of the soldering tip are kept at a value not much higher than the working temperature of the solder, so as to reduce the tendency of the molten solder (which is normally exposed to the air) to oxidize. This necessity for a relatively low temperature requires a prolonged contact between the soldering tip and the metal being soldered. When such contact occurs initially, the heat extracted by the metal from the tip causes the temperature at the point of contact to drop, possibly even below the working temperature of the solder. Only when enough heat has flowed to the point of contact from other parts of the soldering tip, and the metal to be soldered has, as a whole, been raised to the soldering temperature, can the actual soldering proceed.

However, it is to be noted that the apparaus disclosed in the present application provides a relatively large area soldering head which effectively sandwiches the molten solder between the head and the working surface, thus effectively shielding the molten solder from contact with the oxidizing air. Also, the solder is maintained in a molten condition in the soldering head before it is used, the solder in the heal also being protected from the air until it is needed for a soldering operation. Since the solder is thus protected from the air before and during the soldering operation, the soldering head can be held at a temperature substantially higher than the melting point of the solder, although such a temperature would be intolerably high for a conventional soldering operation. Thus, when contact with the surface to be soldered is first made, the interface surface, though instantaneously lower than the average tip temperature, can nevertheless be at, or well above, the required working temperature of the solder. Therefore, the sequence of operation (involving contact, solder feeding, abrasion, and removal of the tip) can be conducted with great rapidity, and a sound soldered joint can be produced because the temperature of the soldered surface is adequately high throughout the process. High speed operation is of course advantageous in automatic or mechanized soldering operation.

Another important benefit accruing as a result of using a very high soldering temperature and a short contact time is that very little heat is conducted to the metal being soldered, so that as a whole, such metal remains at a relatively low temperature although the area being soldered is higher than the working temperature of the solder. When the tip is removed after the soldering operation is completed, the small amount of heat concentrated at the interface is rapidly conducted and dissipated into the relatively cool body of the metal. Thus, the working surface and the solder thereon is rapidly cooled to a temperature below the solidus of the solder, and the soldered joint is solidified with great speed. It follows that the shorter the contact between the tip and the surface, the more rapid the cooling when the tip is removed.

As an illustration of the results obtainable by the present invention, soldering leads to aluminum foil capacitor requires a solder having a working temperature of about 650° F. In a hand operation using a conventional soldering tip, approximately seven seconds is required to bring the joint to a suitable soldering temperature and to complete a joint. However, in the use of the disclosed apparatus and method, it is possible to hold the temperature of the soldering tip at 900–1000° F., whereby the same joint may be completed in approximately a half second.

While I have a shown and described the preferred forms of my invention, it should be understood that various changes may be made in their construction by those skilled in the art, without departing from the spirit of the invention as defined in the appended claim.

Having thus described the invention, I claim:

Soldering apparatus for applying solder to an object and comprising: a soldering head having a substantially flat but roughened surface of hard, refractory material for abrading said object, said soldering head having a solder reservoir formed therein, means mounted on the head for heating said abrading surface substantially above the melting point of said solder, said soldering head having a passage from said reservoir to said abrading surface, means mounted on the head for forcibly extruding molten solder through said passage and for sealing against the entry of air into said reservoir, and means operatively connected to the head to move said head relative to and in contact with the object to abrade the area of said object underlying the molten solder extruded thereonto.

References Cited in the file of this patent

UNITED STATES PATENTS

| | | |
|---|---|---|
| 1,172,161 | Moench | Feb. 15, 1916 |
| 1,172,545 | Miles | Feb. 22, 1916 |
| 1,233,614 | Self | July 17, 1917 |
| 1,238,671 | Holcomb | Aug. 28, 1917 |
| 1,400,784 | Archer | Dec. 20, 1921 |
| 1,508,076 | Taylor | Sept. 9, 1924 |
| 1,760,519 | Palmer | May 27, 1930 |
| 1,813,657 | Boothman et al. | July 7, 1931 |
| 1,893,093 | Linville et al. | Jan. 3, 1933 |
| 1,927,570 | Lofthouse | Sept. 19, 1933 |
| 2,087,716 | Banscher | July 20, 1937 |
| 2,286,978 | Rivera | June 16, 1942 |
| 2,344,589 | Bogner | Mar. 21, 1944 |
| 2,381,025 | Addink | Aug. 7, 1945 |
| 2,426,650 | Sivian | Sept. 2, 1947 |
| 2,538,474 | Schiffleger | Jan. 16, 1951 |
| 2,662,500 | Fort et al. | Dec. 15, 1953 |

FOREIGN PATENTS

| | | |
|---|---|---|
| 386,249 | Great Britain | Jan. 12, 1933 |